United States Patent
Meier et al.

(10) Patent No.: US 9,889,715 B2
(45) Date of Patent: Feb. 13, 2018

(54) SUSPENSION MEMBER FOR A MOTOR VEHICLE AND METHOD OF FORMING THE SAME

(71) Applicant: Ford Global Technologies, LLC, Dearborn, MI (US)

(72) Inventors: Christoph Meier, Köln (DE); Peter Kurbel, Overath (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/932,129

(22) Filed: Nov. 4, 2015

(65) Prior Publication Data

US 2016/0121677 A1 May 5, 2016

(30) Foreign Application Priority Data

Nov. 5, 2014 (DE) .......... 10 2014 222 572
Nov. 5, 2014 (DE) .......... 10 2014 222 574

(51) Int. Cl.
*B60G 7/00* (2006.01)
*B21D 53/88* (2006.01)
*B21D 35/00* (2006.01)

(52) U.S. Cl.
CPC ............ *B60G 7/005* (2013.01); *B21D 53/88* (2013.01); *B60G 7/001* (2013.01); *B21D 35/001* (2013.01); *B60G 2200/142* (2013.01); *B60G 2204/416* (2013.01); *B60G 2206/10* (2013.01); *B60G 2206/122* (2013.01); *B60G 2206/81* (2013.01); *B60G 2206/811* (2013.01); *B60G 2206/8102* (2013.01); *B60G 2206/83* (2013.01)

(58) Field of Classification Search
CPC B60G 7/005; B60G 7/001; B60G 2206/8102; B60G 2206/122; B60G 2200/142; B60G 2206/811; B60G 2206/81; B60G 2204/416; B60G 2206/10; B60G 2206/83; B21D 53/88; B21D 35/001
See application file for complete search history.

(56) References Cited

U.S. PATENT DOCUMENTS

| 2003/0074947 | A1 | 4/2003 | Rosenberger et al. | |
| 2008/0193208 | A1 | 8/2008 | Nordloh et al. | |
| 2009/0295113 | A1* | 12/2009 | Inoue | B60G 7/001 280/124.134 |
| 2010/0158603 | A1 | 6/2010 | Behre et al. | |
| 2010/0264615 | A1* | 10/2010 | Guttilla | B60G 3/20 280/124.134 |
| 2011/0285102 | A1* | 11/2011 | Yu | B60G 7/001 280/124.134 |

(Continued)

FOREIGN PATENT DOCUMENTS

EP 1585641 A1 10/2005

*Primary Examiner* — Darlene P Condra
(74) *Attorney, Agent, or Firm* — Burgess Law Office, PLLC; Raymond L. Coppiellie

(57) ABSTRACT

A suspension member for a motor vehicle including a control arm or transverse link having a ball joint seat for receiving a press-fit ball joint. The ball joint seat including a reinforcement section formed from the material of the suspension member in a region thereof provided for friction or press-fit contact with the ball joint. A method for producing the control arm or transverse link includes increasing the material thickness of the reinforcement section by deformation.

9 Claims, 3 Drawing Sheets

(56) References Cited

U.S. PATENT DOCUMENTS

| | | | |
|---|---|---|---|
| 2012/0141192 A1* | 6/2012 | Kwon | B60G 7/005 403/135 |
| 2016/0096409 A1* | 4/2016 | Bromme | F16D 65/128 280/124.134 |
| 2016/0114641 A1* | 4/2016 | Iwasawa | B60G 7/001 280/124.134 |
| 2016/0229247 A1* | 8/2016 | Kuroda | B60G 7/001 |

* cited by examiner

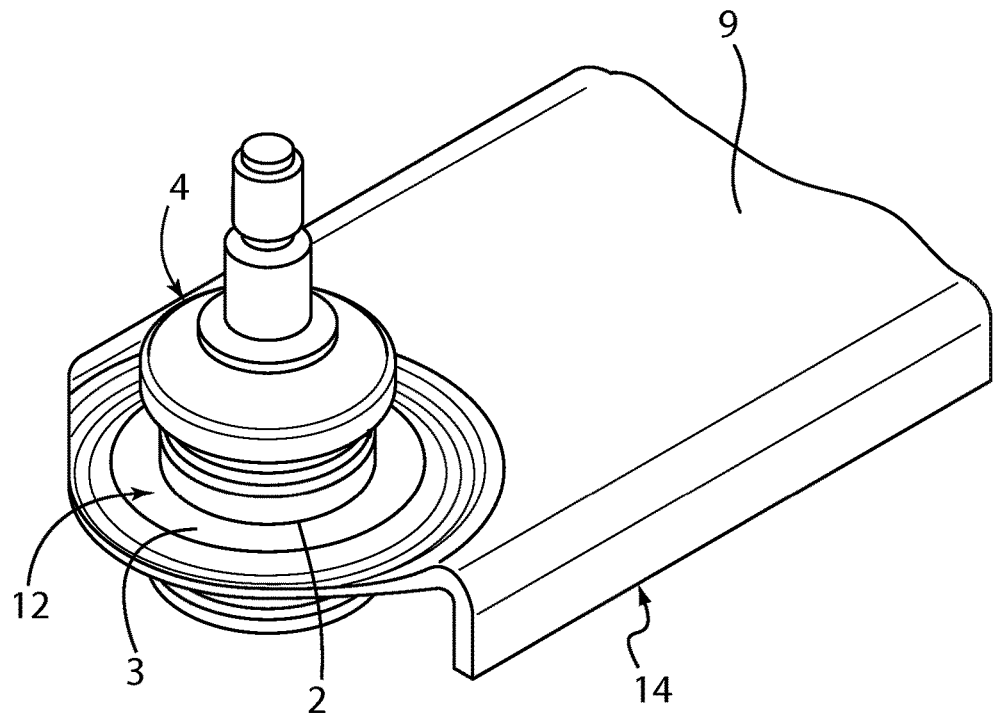
Fig. 1
Fig. 2
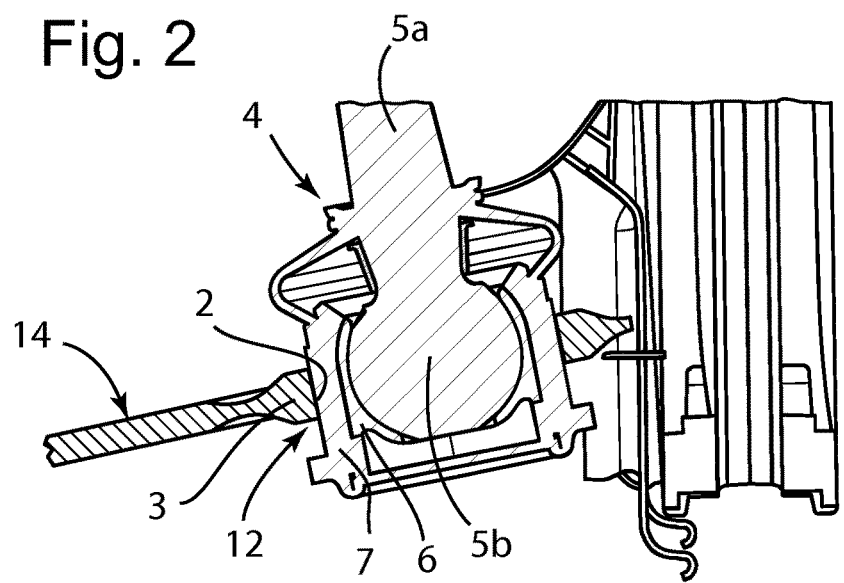

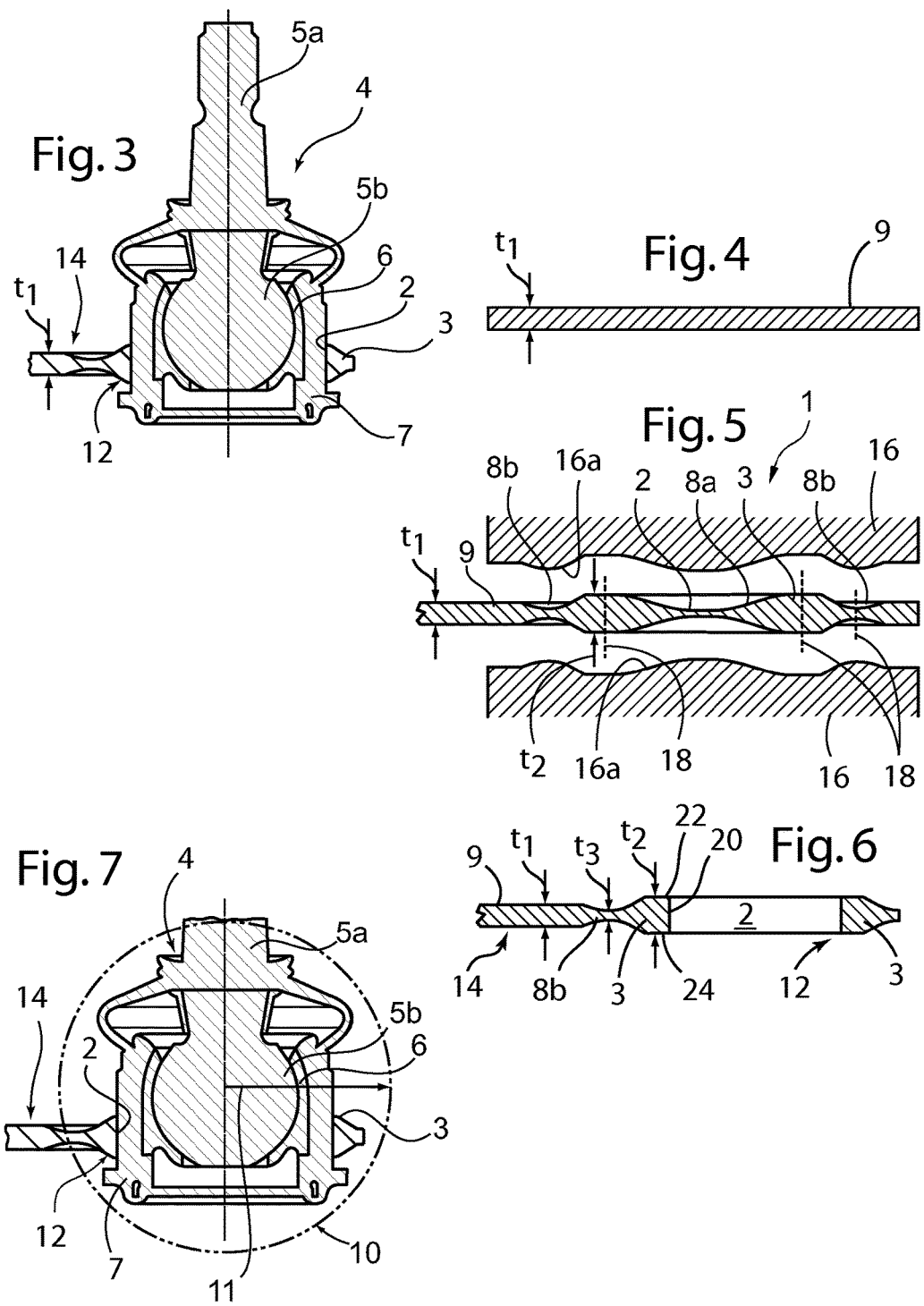

SUSPENSION MEMBER FOR A MOTOR VEHICLE AND METHOD OF FORMING THE SAME

CROSS-REFERENCE TO RELATED APPLICATIONS

Not Applicable.

BACKGROUND OF THE INVENTION

1. Field of the Invention

The present invention relates to a suspension member for a motor vehicle; and, more specifically, to a suspension member having a structure for receiving a ball joint.

2. Description of Related Art

Motor vehicles typically include a suspension system having springs, shock absorbers and members connecting the wheels to the chassis or self-supporting body of the motor vehicle. In contrast to rigid axles, individual wheel suspension systems include separate suspension members on each side of the motor vehicle, such that the wheel positions on the two sides do not influence one another. Wheel suspension systems typically include suspension members such as control arms or links that fix the wheels horizontally to the chassis or body. Control arms or transverse links are one part or component of wheel suspension systems, in particular of front-wheel suspension systems. The control arm or transverse link is transverse or perpendicular to the direction of travel.

One example of a control arm is a single-shell triangular transverse link, wherein two control or connecting arms connect by way of rubber bearings to the body, and one control or connecting arm is connected by way of a joint, typically a ball joint, to a wheel carrier of a wheel.

Ball joints transmit and absorb forces from multiple directions. They are composed substantially of a joint pin having a ball on one end, a shell receiving the ball of the pin, and a joint housing accommodating the shell and parts of the joint pin. The ball of the ball pin slides in the prestressed, permanently lubricated shell, which is protected against moisture and dirt by the housing.

The ball joint housing is connected to a corresponding control or connecting arm by way of a press-fit connection, a welded connection, a screw connection, a rivet connection, and the like. The press-fit connection is a low cost variant. However, a press-fit connection has a large space requirement in relation to other connection types. A press fit connection generally includes an extruded or pressed flange member circumscribing an opening in the control arm. For example, the press-fit seat is typically a deep-drawn cylinder in the material of the link. The material thickness of the wall of the press-fit seat and corresponding large bend radius of the material position the press-fitted ball joint inwardly, toward the vehicle, in relation to the vehicle dimensions than with other methods. Wherein the press fitted ball joint connection is spaced further from the wheel carrier and brake disk. This has an adverse effect on the steering characteristics of the vehicle, as the steering offset is not optimally configured.

SUMMARY OF THE INVENTION

A first example of the invention is a component for a wheel suspension including a member having a material thickness and a ball joint seat. The ball joint seat including an opening and a reinforcement structure surrounding the opening. The reinforcement structure having a material thickness, the material thickness of the reinforcement structure being greater than the material thickness of the member.

Furthermore, a method of forming a suspension member for a wheel suspension is disclosed, in particular, a control arm or transverse link. The method includes providing a metal sheet having an initial material thickness as starting material. The method further includes providing a tool for cutting and deforming the metal sheet and cutting a shape corresponding to the basic shape of the component out of the metal sheet. Further steps include deforming the cut-out metal sheet to form the component, wherein the component includes a ball joint seat having a region provided for friction fit contact with a ball joint. An additional step includes forming a reinforcement structure in a region of the ball joint seat provided for friction fit contact with the ball joint wherein the reinforcement structure has a material thickness, the material thickness greater than the initial material thickness of the metal sheet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows a partial perspective view of an exemplary embodiment of a control arm or transverse link having a press-fit ball joint in an exemplary embodiment of a ball joint seat according to the present invention.

FIG. 2 shows a partial cross-sectional view of a control arm or transverse link having a press-fit ball joint in the ball joint seat according to the present invention adjacent a wheel assembly.

FIG. 3 shows an enlarged partial cross-sectional view of a press-fit ball joint in the ball joint seat according to the present invention.

FIG. 4 shows a cross-sectional view of a workpiece for forming a control arm or transverse link having a ball joint seat according to the invention.

FIG. 5 shows a cross-sectional view of a workpiece after partial forming step of a control arm or transverse link having a ball joint seat according to the invention.

FIG. 6 shows a cross-sectional view of a ball joint seat according to the invention after a further forming step.

FIG. 7 shows a cross-sectional view of a ball joint seat and a press-fit ball joint according to an exemplary embodiment of the present invention.

DETAILED DESCRIPTION OF THE PREFERRED EMBODIMENTS

Figure 8:
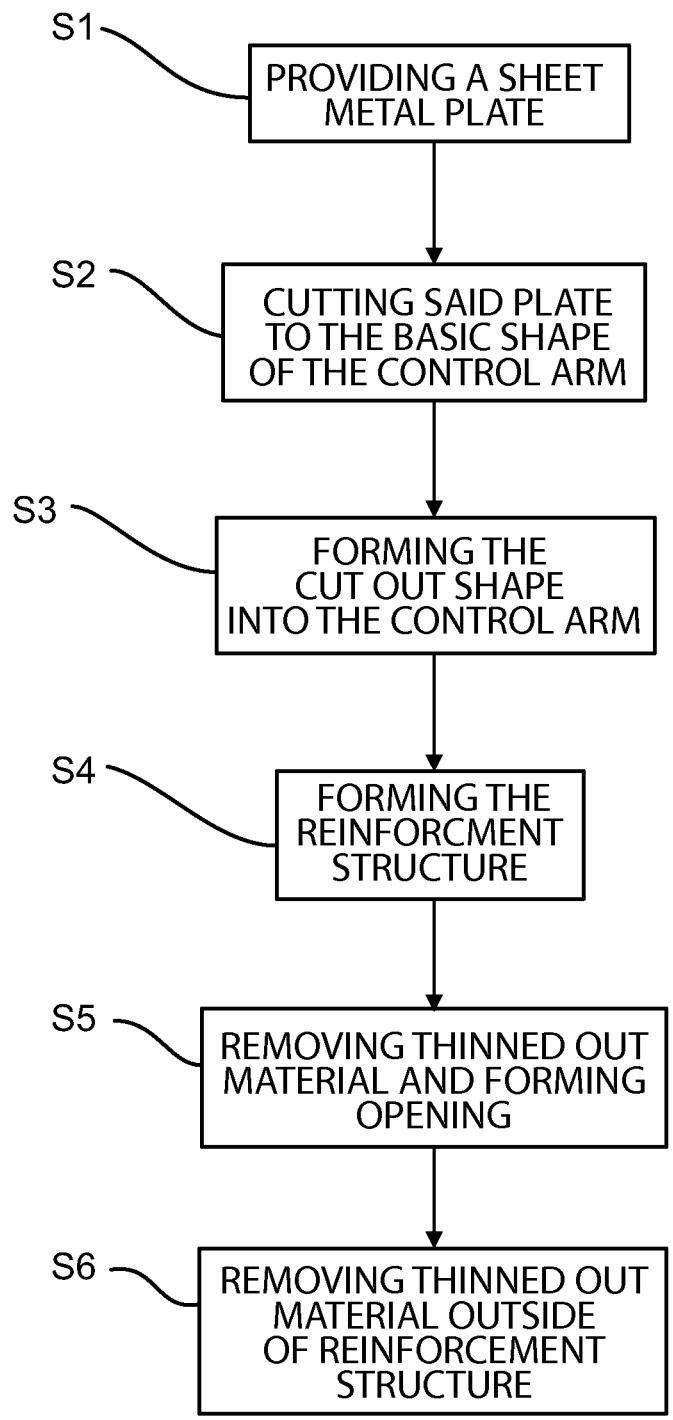
FIG. 8 shows a flow diagram of an exemplary embodiment of the method according to the invention.

The following description of the preferred embodiment(s) is merely exemplary in nature and is in no way intended to limit the invention, its application, or uses.

FIGS. 1-2 illustrate a control arm or transverse link having a ball joint seat, seen generally at 12, on one end of an exemplary embodiment of a control arm or transverse link 14 of a motor vehicle according to an exemplary embodiment of the present invention. A ball joint 4, with joint pin 5a, ball 5b, ball shell 6 and housing 7 is situated in an opening 2 of the ball joint seat 12. The ball joint seat 12 has, in the disclosed example, a reinforcement structure 3 situated about the opening 2. In one example, the ball joint 4 is pressed into the opening 2 of the control arm or transverse link 14. The pressing operation forces the ball joint 4 into the opening providing a friction fit or press-fit engagement between the control arm or transverse link 14 and the ball joint 4.

In the exemplary embodiment of FIG. 1, the reinforcement structure 3 is formed in the region of the opening 2 of the control arm or transverse link 14. FIG. 1 illustrates the reinforcement structure 3 adjacent the outer boundary or circumferential edge of the opening 2. The reinforcement structure 3 may be arranged or formed in some region other than adjacent the opening 2 of the control arm or transverse link 14, if the press or friction fit engagement or contact with the ball joint 4 is realized in said corresponding region.

In the present example, the control arm or transverse link 14 is formed from a single sheet-metal plate. The control arm or transverse link 14 is punched out of a sheet-metal plate or single piece of metal sheet. Alternatively, the control arm or transverse link 14 may also be formed in separate sheets and then connected to one another, for example by rivet connection or screw connection. The shape or configuration of the control arm or transverse link 14, and in particular the reinforcement structure 3 adjacent the opening 2 or in the region provided for the press or friction fit engagement with the ball joint 4, are preferably produced by deformation in a tool, including punching, bending, flow pressing, extrusion, pulling-through, deep drawing or plunging. The stated methods may also be combined with one another. Here, the deformation methods can be implemented in a tool provided for the purpose, in particular in a sheet metal working tool.

FIG. 4 illustrates the starting material of the control arm or transverse link 14, and of the reinforcement structure 3, is preferably a metal sheet, that is to say a flat metal workpiece having a material thickness (t1). Ultimately, the material of the control arm or transverse link goes through a forming process that forms the reinforcement structure 3 with a material thickness (t2). The shape or configuration of the control arm or transverse link 14, including that of the reinforcement structure 3 for receiving the ball joint, is conventionally produced in a tool designed for carrying out the deformation processes. The material of the reinforcement structure 3, in the region provided for the press or friction fit contact with the ball joint 4, is such that the material has an increased thickness (t2) in relation to the original thickness (t1) of the material of the control arm or transverse link 14.

The metal sheet has a bead-like thickening produced by deformation of the material of the original sheet-metal thickness (t1). No additional material is required for forming the reinforcement structure 3. Because of the process, the reinforcement structure 3 has increased structural rigidity in the region adjacent the opening 2 resulting in greater structural strength imparted to it in relation to material not deformed in this way. The reinforcement structure 3 has a smaller width, that is to say smaller outer diameter in relation to conventional ball joint seats in the region provided for press-fit contact with the ball joint 4. The reinforcement structure 3 receives the ball joint 4 by press-fitting without losing the structural integrity due to the pressure exerted, or without being plastically deformed wherein, under some circumstances, the stability/functionality of the connection between control arm or transverse link 14 and wheel carrier by way of the ball joint 4 is lost. The smaller width, or spacing, between the ball joint 4 and outer edge of the control arm or transverse link 14 provides a press-fit connection close to the wheel carrier and brake disk.

What is preferable is a control arm or transverse link 14 with a ball joint seat 12 for friction or press-fit contact with the ball joint 4 in the opening 2 of the ball joint seat 12. In this embodiment, the opening region is that region of the ball joint seat 12 in which there is close contact, which effects the friction or press-fit connection, between the ball joint 4 and the ball joint seat 12. The material of the ball joint seat 12 is preferably reinforced by deformation, which increases the material thickness (t2), in the region of the opening 2 of the ball joint seat 12.

FIGS. 4-6 illustrate an example of one method or series of steps for forming the reinforcement structure 3. FIG. 4 illustrates the thickness (t1) of the original sheet metal or metal plate 9. FIG. 5 illustrates forming the reinforcement structure 3 by upsetting of the material, for example by punching. Alternatively, the reinforcement structure 3 is produced, for example, by flow pressing. As illustrated, opposite halves or portions of a forming die 16, and particularly the surface profile 16a thereof, causes an increased thickness (t2) of the material of the sheet metal or metal plate 9 in the regions provided for contact with the ball joint 4. The adjacent regions 8a, 8b of the material of the sheet metal or metal plate 9 are thinned during the deformation process whereby the thickness (t3) thereof is decreased or less than the thickness (t1) material of the sheet metal or metal plate 9. The increased thickness (t2) of the reinforcement structure 3, compared to the thickness (t1) of the sheet metal or metal plate 9, means that the reinforcement structure 3 is dimensioned to be taller and deeper. The reinforcement structure 3 has greater dimensions in the upward and downward directions, in relation to the thickness (t1) of the original sheet metal or metal plate 9.

As illustrated in FIG. 6, the thinned regions 8a, 8b are cut out or separated, see cut lines 18 from the sheet metal or metal plate 9 by way of punching. In this way outer regions or area adjacent the opening 2 of the control member or transverse link 14, which are not required, can be severed off. As shown, the opening 2 has an inner wall 20 forming an engagement surface. The engagement surface being that surface that contacts or engages the ball joint 4. As illustrated, the inner wall 20 extends from a top side or surface 22 of the reinforcement structure 3 to a bottom side or surface 24 of the reinforcement structure 3. In the disclosed embodiment, the length of the inner wall 20 between the top side 22 and bottom side 24 of the reinforcement structure 3 is the same as the thickness (t2) thereof. Accordingly, increasing the thickness (t2) increases the amount of inner wall 20 and correspondingly the engagement surface available for friction or press-fit contact with the ball joint 4.

FIG. 7 illustrates the control arm or transverse link 14 having, for example, a press-fitted ball joint 4 in the opening 2 adjacent the reinforcement structure 3. The circle 10 denotes clearance to the structure of the control arm or transverse link 14 defined by the arrow 11 denoting the distance from the center of the ball joint 4, which is identical to the center of the ball 5b, to the furthest extending portion or outer boundary of the control arm or transverse link 14.

In the present example, the starting material of the control arm or transverse link 1, and of the reinforcement structure 3, is preferably a metal sheet, that is to say a flat metal workpiece having an initial thickness (t1). The control arm or transverse link 14 includes a reinforcement structure 3 in a region of the control arm or transverse link 14 provided for a press-fit or friction fit contact or engagement with the ball joint 4 in the opening 2 of control arm or transverse link 14. In this embodiment, the region is that region of the reinforcement structure 3 in which there is close contact, which effects the friction or press-fit connection, between the ball joint 4 housing and reinforcement structure 3. The material of the control arm or transverse link 14 is preferably reinforced by deformation in the region of the opening 2 of the control arm or transverse link 14 receiving the ball joint 4. The reinforcement structure 3 preferably forms part of the ball joint seat 12, in particular a press-fit seat. In one example, the reinforcement structure 3 may be a pot-shaped housing designed to receive, by press-fitting, the ball joint 4 to form a positive press-fit connection to the ball joint 4.

The material of the control arm or transverse link 14 is preferably compressed in the region of opening 2 to form the reinforcement structure 3. Here, compression means moving or transfer of a portion the material of the sheet metal or metal plate to the region, reinforcement structure 3, provided for press-fit contact with the ball joint 4. Compression of the material can be effected by way of pressure exerted on the material in said region, for example by press molding. In one example, forming a control arm or transverse link 14 having a reinforcement structure 3 includes providing a so-called sheet-metal coil on which the metal sheet 9 is wound up. The metal sheet is unwound from the sheet-metal coil and a forming tool cuts a blank out of the metal sheet 9 in a shape corresponding to the basic shape of the control arm or transverse link 14. The blank is preferably punched out of the metal sheet. The elements of the control arm or transverse link 14 are elements typically exhibited by a control arm or link, in particular a transverse link, for example track rods, support arms, fastening devices, and the like. The control arm or transverse link 14 and reinforcement structure 3 are preferably produced as a one or single part sheet-metal element.

The pressure for the deformation and thus for the compression of the material in that region of the reinforcement structure 3 provided for friction or press fit contact with the ball joint 4 can advantageously be imparted by upsetting. Therefore, the material is preferably upset in the region of the reinforcement structure 3 of the control arm or transverse link 14. The control arm or transverse link 14 according to the invention is preferably of single-shell form. Single-shell transverse links can advantageously be produced easily and inexpensively and are distinguished by a low weight. Furthermore, the control arm or transverse link 14 according to the invention is preferably formed with the reinforcement structure 3 as a one or single part sheet-metal element. For this purpose, the material of the entire control arm or transverse link 1 is cut out, preferably punched out, of a sheet-metal plate before the deformation process.

According to the exemplary embodiment, after a shape is cut out of the sheet-metal blank, the control arm or transverse link 14 and reinforcement structure 3 are formed by punching. A forming tool produces the control arm or transverse link 14 and the reinforcement structure 3 in the region provided for friction or press-fit contact with the ball joint 4. While punching is the preferred forming method, other mechanisms or tools for forming the reinforcement structure are contemplated. The tool is advantageously a sheet-metal tool or else a transfer tool for implementing further deformation methods. Cold-working methods are preferred for the punching and/or for some other method for the deformation processes, though heat may be supplied.

The material of the reinforcement structure 3 is, in the region provided for the friction or press-fit contact with the ball joint, reinforced by deformation, preferably such that the extent of the material has an increased thickness (t2) in relation to the original thickness (t1) of the material of the control arm or transverse link 14. As illustrated, in the region of the reinforcement structure 3, a bead-like thickening of the metal sheet is produced, in which the material exceeds the original sheet-metal thickness (t1). Here, corresponding to the shape of the ball joint 4, the reinforcement structure 3 preferably has a circular or ring-shaped form imparted to it.

As illustrated a single-shell control arm or transverse link 14 is produced in the method according to the invention includes ball joint press-fit 4 into the reinforcement structure 3. The ball joint 4 is, by way of its housing, surrounded by the reinforcement structure 3 and frictionally connected to the control arm or transverse link 14. The production of single-shell control arm or transverse link 14 according to the disclosed example is advantageously inexpensive, and provides a friction or press-fit locking of the ball joint 4. As illustrated, the press-fit connection positions the ball joint 4 close to the wheel carrier and brake disk. With the press-fitted ball joint 4, the single-shell control arm or transverse link 14 can be connected to a wheel carrier of a motor vehicle.

An exemplary method of forming the control arm or transverse link 14 with the reinforcing structure 3, as illustrated in the FIG. 8, includes, in step S1, providing a sheet-metal plate or metal sheet 9 as a starting material. In step S2, a shape corresponding to the basic shape of the desired control arm or transverse link 14 is cut out of the metal sheet 9. The dimensions of the blank to be cut out are configured such that all regions to be deformed, and all regions which are not to be deformed, of the control arm or transverse link 14 are encompassed in the shape. The blank is cut from the sheet-metal plate 9 preferably by punching.

In a further step S3, a tool for deforming the cut-out metal sheet is provided. The tool is preferably designed for punching, or else for other deformation methods; for example, bending, flow pressing, extrusion, pulling-through, deep drawing, and plunging. Here, the stated methods, and further methods, may be combined with one another. The blank or metal sheet is positioned in the tool and formed to a predetermined shape of the control arm or transverse link 14.

In step S4, the forming die 16 or some other tool or forming mechanism forms the reinforcement structure 3 on the control arm or transverse link 14 in the area thereof for receiving a ball joint 4. In particular, in that region of the control arm or transverse link 14 provided for the friction or press-fit contact with the ball joint 4. The reinforcement structure 3 is produced by additional deformation. Here, step S4 may be performed at the same time as step S3. It is however expedient for the basic shape of the control arm or transverse link 14 for receiving the ball joint 4 to have been produced already before the reinforcement structure 3 is produced.

In step S5, that material of the control arm or transverse link 1 thinned or having a reduced material thickness (t3) during the production of the reinforcement structure 3 and located adjacent thereto is punched out to create the opening 2.

In step S6, those regions 8b outside the reinforcement structure 3 thinned during the production of the reinforcement structure 3 are punched out or removed.

The dimensions, contours, and thickness of the reinforcement structure 3 vary with the shape of the control arm or transverse link 14 and the installation position thereof in the motor vehicle. Therefore, transverse links according to the invention may deviate, regarding the stated parameters, from the illustrations in the figures. What is ideal is an arrangement of the press-fit connection as close as possible to the wheel carrier and brake disk.

As illustrated, the control arm or transverse link 14 is of simple but stable structure and having a wheel-side coupling structure with a reinforcement structure 3 adjacent and opening 2 for receiving a ball joint 4. The reinforcement structure 3 provides for a friction or press-fit contact with the ball joint 4. The reinforcement structure 3 is preferably produced in the region of the opening 2 for receiving the ball joint 4.

As set forth above, the reinforcement structure 3 is preferably produced by punching. Punching is advantageously suitable for producing the reinforcement structure 3 because, the force of the forming die 16 exerted on the metal sheet 9, displaces material from one region to another. In the present example, material is moved from the regions adjacent to the reinforcement structure 3 to the region of the reinforcement structure 3.

Furthermore, the reinforcement structure 3 may be produced by upsetting of the metal sheet 9. The upsetting of the metal sheet may be effected for example by punching, or else by other deformation methods or with specific apparatuses that might be provided in the above-mentioned tool.

As illustrated, the reinforcement structure 3 increases the sheet-metal thickness (t2) in the region of the reinforcement structure 3 in relation to the adjacent regions (t1), (t3). Working the material in this way generates an elevated reinforcement structure. The increase of the sheet-metal thickness (t2) can also be conceived as a bead-like protuberance of the surface structure in said region, which arises because of material being displaced into the region because of the deformation process.

The additional deformation causes the metal sheet to be thinned (t3) in the regions adjacent to the thickening (t2). Material transferred from the adjacent regions into the region of the reinforcement structure 3 produces the reinforcement structure. The material in the thinned regions 8*a*, 8*b* is preferably removed after the material transfer, for example by punching.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A component for a wheel suspension comprising:
a member having a material thickness and a ball joint seat;
said ball joint seat having an opening and a reinforcement structure surrounding said opening; and
said reinforcement structure having a material thickness, said material thickness of the reinforcement structure being greater than said material thickness of said member; and
said member having a material thickness adjacent said reinforcement structure, said material thickness adjacent said reinforcement structure being less than said material thickness of said reinforcement structure and said material thickness of said member.

2. The component of claim 1 including said reinforcement structure circumscribing said opening, said reinforcement structure forming an inner wall of said opening wherein said inner wall forms an engagement surface of said ball joint seat extending between an upper end of said inner wall of said reinforcement structure and a lower end of said inner wall of said reinforcement structure defining an engagement surface thickness; and
said engagement surface thickness greater than said material thickness of said member.

3. The component of claim 1 including a ball joint, said ball joint positioned in said opening and engaging an inner wall of said opening of said ball joint seat in a press-fit connection.

4. The component of claim 1 in which material of the member is upset in the region of the reinforcement structure.

5. The component of claim 1 wherein the member is a transverse link having a single-shell form.

6. The component of claim 5 wherein the reinforcement structure is formed with the transverse link as a unipartite sheet-metal element.

7. The component of claim 1 which the transverse link is punched out of a sheet-metal plate.

8. The component of claim 1 being a one-piece construction, wherein said member and said reinforcement structure are formed from a single piece of material.

9. The component of claim 1 wherein said reinforcement structure is a continuous part of and an extension of said transverse link.

* * * * *